United States Patent [19]

Liet et al.

[11] Patent Number: 4,538,949
[45] Date of Patent: Sep. 3, 1985

[54] CONVEYOR FOR CONVEYING SILAGE OR THE LIKE MATERIAL

[75] Inventors: Cornelis H. Liet; Fredericus Liet, both of Losser, Netherlands

[73] Assignee: Trioliet-Mullos Silo Nederland B.V., Netherlands

[21] Appl. No.: 517,009

[22] Filed: Jul. 25, 1983

[30] Foreign Application Priority Data

Jul. 26, 1982 [NL] Netherlands .......................... 8202987

[51] Int. Cl.³ ............................................. A01D 87/12
[52] U.S. Cl. ................................... 414/24.6; 198/692; 198/813
[58] Field of Search ............................ 414/24.5, 24.6; 198/692, 698, 861, 699, 835, 842, 816, 813; 241/101 A, 101.7

[56] References Cited

U.S. PATENT DOCUMENTS

| | | | |
|---|---|---|---|
| 675,703 | 6/1901 | Allen | 198/699 |
| 1,571,365 | 2/1926 | Bausman | 198/842 |
| 1,779,720 | 10/1930 | Wood | 198/692 |
| 2,925,165 | 2/1960 | Rake | 198/842 |
| 2,939,182 | 6/1960 | Fleissner | 198/622 X |
| 3,082,858 | 3/1963 | King | 198/842 |
| 3,430,758 | 3/1969 | Searles | 198/498 |
| 4,037,391 | 7/1977 | Mitchell et al. | 198/640 X |
| 4,250,989 | 2/1981 | Grundken et al. | 198/842 |
| 4,360,167 | 11/1982 | Beccalori et al. | 414/24.6 |

FOREIGN PATENT DOCUMENTS 2027670 2/1980 United Kingdom ............... 414/24.6

Primary Examiner—Leslie J. Paperner
Assistant Examiner—Lyle Kim
Attorney, Agent, or Firm—Kane, Dalsimer, Kane, Sullivan and Kurucz

[57] ABSTRACT

The invention relates to a conveyor device consisting of endless chains or the like, which are adapted to be driven and which are led over end rollers, while cross-bars extend between the chains, the cross-bars carrying teeth, the path which is followed by the cross-bars with the teeth including a conveying portion and an inactive portion which is positioned lower than the conveying portion. According to the invention the inactive portion of the path comprises a stretch, which extends partly towards the conveying portion and partly away from the conveying portion. The invention further relates to an apparatus for loosening and apportioning silage or the like material provided with a storage container, which comprises a carrier conveyor and a loosening conveyor, which loosening conveyor joins this carrier conveyor and is inclined upwardly. This loosening conveyor may be executed as the conveyor device described hereinabove.

16 Claims, 2 Drawing Figures

U.S. Patent  Sep. 3, 1985  4,538,949
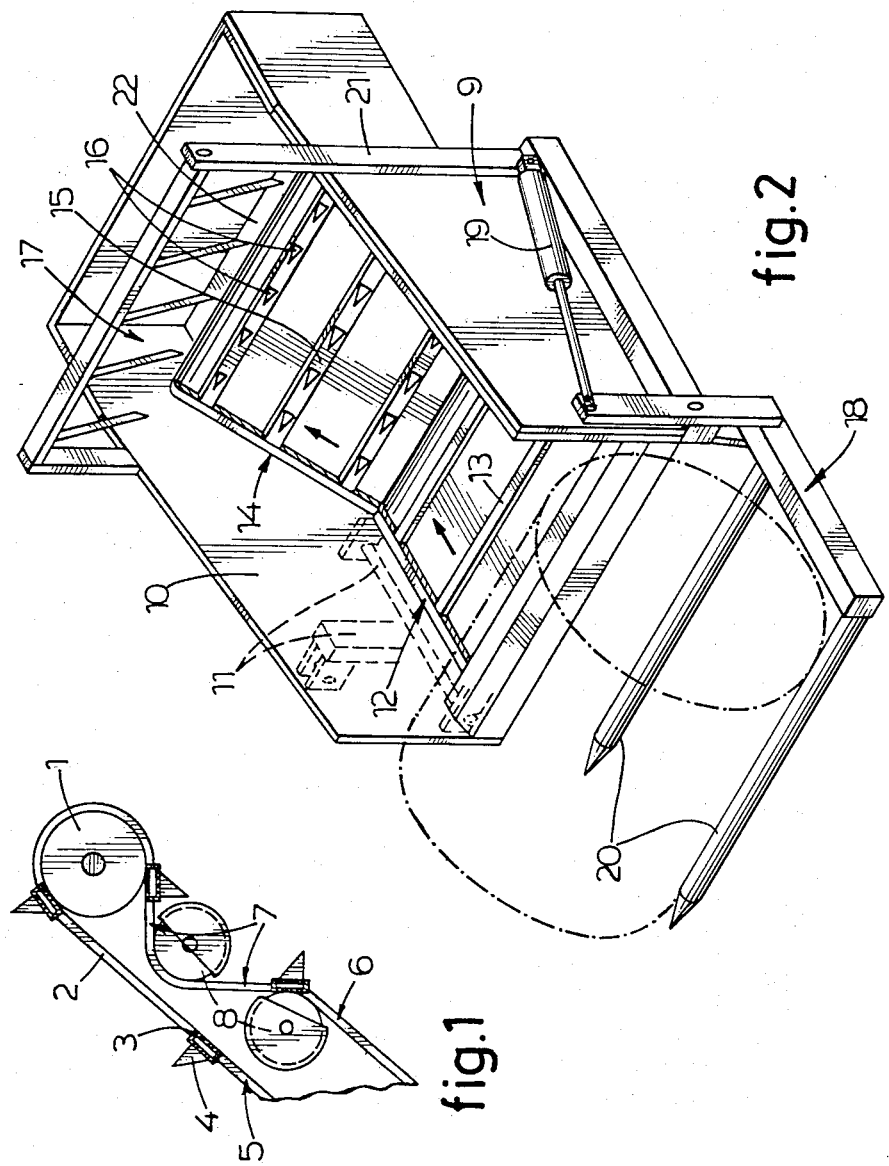

CONVEYOR FOR CONVEYING SILAGE OR THE LIKE MATERIAL

BACKGROUND OF THE INVENTION

The invention relates to a conveyor means consisting of endless chains or the like which are adapted to be driven and which are led over end rollers, while cross-bars extend between said chains, said cross-bars carrying teeth, the path which is followed by the cross-bars with the teeth including a conveying portion and an inactive portion which is positioned lower than the conveying portion.

When a conveyor means of this type is used for conveying — and in general also for loosening — fibrous material, e.g. in the shape of rectangular bales of crop or in the shape of round spirally wound bales of crop, it has been found in practice that the delivery of the crop at the end of the conveying portion leads to great difficulties. This is caused by the fact that at the moment of passing the relative end rollers the points of the teeth are positioned further away from each other, so that fibres which are wrapped loop-shaped around the teeth of successive cross-bars are tensioned and are forced towards the base of at least one of the teeth. This prevents these fibres to fall downwardly when leaving the end of the conveying portion.

SUMMARY OF THE INVENTION

It is an object of the present invention to provide a conveyor means of the type mentioned hereinabove, wherein this disadvantage is removed in an effective manner.

For this purpose the conveyor means according to the invention is characterized in that the inactive portion of the path comprises a stretch, which extends partly towards the conveying portion and partly away from the conveying portion.

In this stretch the teeth of successive cross-bars are directed towards each other, so that their points will be positioned at a smaller distance from each other. In this way a loosening of the fibres which are wrapped around these teeth will automatically take place at the location of this stretch.

According to a simple embodiment of the conveyor means according to the invention this stretch of the inactive portion of the path is V-shaped.

The measures proposed hereinabove are particularly effective when the end rollers are positioned at different heights and the conveying portion is at least partly inclined upwardly.

In this way it may be attained that the part of the said stretch of the inactive portion of the path which extends towards the conveying portion is at least approximately horizontal, so that the teeth at the beginning of this stretch are directed at least approximately vertically downward, which of course facilitates the loosening of the fibres to a large extent.

Preferably the said stretch of the inactive portion of the path will follow immediately after the upper end rollers.

The invention further relates to an apparatus for loosening and apportioning silage or the like material, provided with a storage container, which has a coupling member adapted to be coupled with a tractor, said storage container comprising a carrier conveyor, which carrier conveyor is coupled or may be coupled with a drive means; a loosening conveyor which joins this carrier conveyor and which is inclined upwardly and is coupled or may be coupled with a drive means, said loosening conveyor consisting of endless chains or the like, which are led over end rollers, while cross-bars extend between said chains, said cross-bars carrying teeth; a driven apportioning and return mechanism extending at a distance above the loosening conveyor; and a tilting device for taking up and discharging the material to the carrier conveyor, which tilting device has a support means, which in its lowermost position extends substantially at the level of the ground and is pivotable through approximately 90°.

According to the invention this apparatus is characterized in that the path which is followed by the cross-bars with the teeth of the loosening conveyor includes a conveying portion and an inactive portion which is positioned lower than the conveying portion, whilst the inactive portion of the path comprises a stretch, which extends partly towards the conveying portion and partly away from the conveying portion.

BRIEF DESCRIPTION OF THE DRAWING

The invention will hereafter be elucidated with reference to the drawing.

FIG. 1 is a side view of the upper portion of a conveyor means according to the invention.

FIG. 2 is a perspective view of an apparatus for loosening and apportioning silage or the like material, wherein the loosening conveyor may be executed in the way as shown in FIG. 1.

DESCRIPTION OF A PREFERRED EMBODIMENT

FIG. 1 shows a portion of a conveyor means according to the invention.

This conveyor means consists of two endless chains 2, belts or the like, which are led over end rollers 1 and which are adapted to be driven, while cross-bars 3 extend between these endless chains, which cross-bars carry teeth 4.

The path which is followed by the cross-bars 3 with the teeth 4 comprises an upper conveying portion 5 and a lower inactive portion 6.

In the preferred embodiment of the conveyor means as shown in the drawing the end rollers 1 are positioned at different heights, while at least part of the conveying portion 5 is upwardly inclined.

According to the invention the inactive portion 6 of the path comprises a V-shaped stretch 7, which extends partly towards the conveying portion 5 and partly away from the conveying portion 5. Alternatively it is also possible to add an intermediate section in the stretch 7, which section is approximately parallel to the conveying portion 5.

In the embodiment as shown in the drawing the V-shaped stretch 7 of the path follows immediately after the upper end rollers 1.

The V-shaped stretch 7 of the path may be obtained by means of guides. In the embodiment shown in FIG. 1 the chains 2 or the like are each led over two guide rollers 8. These guide rollers 8 are provided with guard means at the location of their circumferential part, which is out of engagement with the chains 2 or the like as well as at the location of their side portions.

As shown in FIG. 1 the distance between the points of the teeth 4 increases when the upper end rollers 1 are passed, so that fibrous crop, which is caught by successive teeth 4 and is wrapped loop-shaped around these teeth 4 will be virtually tensioned on these teeth 4 and therefore will be prevented to fall downwardly when the upper end rollers 1 are passed. However the points of the teeth 4 of successive cross-bars 3 will be directed towards each other in the V-shaped stretch 7 of the path, so that the distance between the points of successive teeth is decreased. As the part of the V-shaped stretch 7 of the path, which is directed towards the conveying portion 5 is at least approximately horizontal, the teeth 4 will be downwardly directed at the beginning of the V-shaped stretch 7, immediately beyond the upper end rollers 1. In this way a loosening of the fibrous material will be effectively obtained at the location of the V-shaped stretch 7 of the path.

FIG. 2 shows an embodiment of an apparatus for loosening and apportioning silage or the like material, wherein a conveyor means as described hereinbefore may be applied.

This apparatus is provided with a storage container 9, which has a coupling member 11 at the wall 10, which coupling member 11 is adapted to be coupled with a tractor.

The storage container 9 is further provided with a carrier conveyor 12, which is coupled or may be coupled to a drive means and which may consist of two endless chains or the like which are led over end rollers, while cross-bars 13 extend between these endless chains.

The path which is followed by the cross-bars 13 comprises an upper conveying portion, which may extend at least approximately horizontally and an inactive portion which extends at a lower level.

An upwardly inclined loosening conveyor 14 joins the carrier conveyor 12 and is coupled or may be coupled with a drive means. This loosening conveyor 14 comprises two endless chains or the like, which are led over end rollers, whilst cross-bars 15 extend between these endless chains and carry teeth 16.

At a distance above the loosening conveyor 14 an apportioning and return mechanism 17 is positioned, which may be driven by a drive means.

The carrier conveyor 12, the loosening conveyor 14 and the apportioning and return mechanism 17 will mostly be driven from the power take off of the tractor, but it is also possible to use other drive means for this purpose.

A plate-shaped support member for the material is provided underneath the upper portion of the carrier conveyor 12 and of the loosening conveyor 14 respectively.

A tilting device 18, which in its lowermost position extends substantially at the level of the ground, is pivotable through approximately 90° about a shaft, which is perpendicular to the direction of motion of the carrier conveyor 12 and which is carried by the storage container 9. This pivotal movement is obtained by means of a cylinder-piston assembly 19, which is pivotally connected to the storage container 9 at the side remote from the wall 10.

The tilting device 18 is provided with pins 20 or the like, which extend approximately perpendicular to the direction of motion of the carrier conveyor 12 as shown in FIG. 2. In this manner a very compact construction is obtained. As an alternative for the pins 20 it is also possible to use a support plate.

The storage container 9 may have wheels, but can also be made without wheels and be supported in use exclusively by the tractor. This will also lead to a simplification of the construction.

The material, e.g. a round or a rectangular bale of silage will be picked up from the ground by the pins 20 or the like of the tilting device 18, whereafter the material is transferred to the carrier conveyor 12 upon a pivotal movement of the tilting device 18 over approximately 90°.

The carrier conveyor 12 conveys the material to the loosening conveyor 14, which loosens the material with its teeth 16 and takes the material along upwardly.

The apportioning and return mechanism 17 may consist of a rake member, which is pivoted to and fro and which is supported by the storage container 9 by means of the frame 21. This apportioning and return mechanism 17 provides an apportioned discharge of the loosened material, whilst the excess of loosened material is thrown back again.

The material which has passed the upper end of the loosening conveyor 14 and the apportioning and return mechanism 17 cooperating herewith, is directly thrown on the ground. No lateral discharge conveyor is necessary for the material which falls downwardly, as the location of the storage container 9 as shown in FIG. 2 results in that the material is discharged at one side.

A passage 22 for the material which falls downwardly is formed in the storage container 9 at the relative end.

Preferably the loosening conveyor 14 is constructed in the way as shown in FIG. 1 and thus comprises in the inactive portion of the path a V-shaped stretch which extends partly towards the conveying portion and partly away from the conveying portion immediately after the upper end rollers, at which stretch of the inactive portion fibrous material which has not been loosened when passing the upper end rollers is still loosened from the teeth 16 and falls downwardly.

The invention is not restricted to the embodiments shown in the drawing, which may be varied in several ways within the scope of the invention.

We claim:

1. A conveyor means consisting of endless chains or the like, which are adapted to be driven and which are led over end rollers, while cross-bars extend between said chains, said cross-bars carrying teeth, the path which is followed by the cross-bars with the teeth including a conveying portion and an inactive portion which is positioned lower than the conveying portion, wherein the inactive portion of the path comprises a stretch, which extends partly towards the conveying portion and partly away from the conveying portion wherein teeth on adjacent cross-bars face each other along said stretch adapting the conveyor to release a fibrous bundle carried thereby, whereby the bundle carried by the conveying means is tensioned on the teeth when passing the end roller to which it is conveyed, and the tension is removed, and the bundle is released from the conveying means, when the bundle reaches said stretch of the inactive portion.

2. A conveyor means as claimed in claim 1, wherein the said stretch of the inactive portion of the path is V-shaped.

3. A conveyor means as claimed in claim 2, wherein the end rollers are positioned at different heights and the conveying portion is at least partly inclined upwardly.

4. A conveyor means as claimed in claim 1, wherein the part of the said stretch of the inactive portion of the path which extends towards the conveying portion is at least approximately horizontal.

5. A conveyor means as claimed in claim 3, wherein the said stretch of the inactive portion of the path follows immediately after an upper end roller.

6. A conveyor means as claimed in claim 1, wherein the said stretch of the inactive portion of the path is obtained by means of guides.

7. A conveyor means as claimed in claim 6, wherein the chains or the like are led over guide rollers for obtaining the said stretch of the inactive portion of the path.

8. A conveyor means as claimed in claim 7, wherein the guide rollers are provided with guard means at a location of their circumferential portion which is out of engagement with the chains and at the location of their side portions.

9. A conveyor means consisting of endless chains or the like, which are adapted to be driven and which are led over upper and lower end rollers, while cross-bars extend between said chains, said cross-bars carrying teeth, the path which is followed by the cross-bars with the teeth including a conveying portion and an inactive portion which is positioned lower than the conveying portion, wherein the inactive portion of the path comprises a stretch, which extends partly towards the conveying portion and partly away from the conveying portion, while the said stretch of the inactive portion of the path is V-shaped, whilst the end rollers are positioned at different heights and the conveying portion is at least partly inclined upwardly, the part of the said stretch of the inactive portion of the path which extends towards the conveying portion being at least approximately horizontal, the said stretch of the inactive portion of the path following immediately after the upper end roller, the chains or the like being led over guide rollers for obtaining the said stretch of the inactive portion of the path, whereby a fibrous bundle carried by the conveying means is tensioned on the teeth when passing the end roller to which it is conveyed, and the tension is removed, and the bundle is released from the conveying means, when the bundle reaches said stretch of the inactive portion.

10. An apparatus for loosening and apportioning silage or the like material, provided with a storage container, which has a coupling member adapted to be coupled with a tractor, said storage container comprising a carrier conveyor, which carrier conveyor is coupled or may be coupled with a drive means; a loosening conveyor which joins this carrier conveyor and which is inclined upwardly and is coupled or may be coupled with a drive means, said loosening conveyor consisting of endless chains or the like, which are led over end rollers, while cross-bars extend between said chains, said cross-bars carrying teeth; a driven apportioning and return mechanism extending at a distance above the loosening conveyor; and a tilting device for taking up and discharging the material to the carrier conveyor, which tilting device has a support means, which in its lowermost position extends substantially at the level of the ground and is pivotable through approximately 90°, wherein the path which is followed by the cross-bars with the teeth of the loosening conveyor includes a conveying portion and an inactive portion which is positioned lower than the conveying portion, whilst the inactive portion of the path comprises a stretch, which extends partly towards the conveying portion and partly away form the conveying portion whereby a fibrous bundle carried by the conveying means is tensioned on the teeth when passing the end roller to which it is conveyed, and the tension is removed, and the bundle is released from the conveying means, when the bundle reaches said stretch of the inactive portion.

11. An apparatus for loosening or apportioning silage or the like material, provided with a storage container, which has a coupling member adapted to be coupled with a tractor, said storage container comprising a carrier conveyor, which carrier conveyor is coupled or may be coupled with a drive means; a loosening conveyor which joins this carrier conveyor and which is inclined upwardly and is coupled or may be coupled with a drive means, said loosening conveyor consisting of endless chains or the like, which are led over end rollers, the conveyor having an inactive portion which is positioned lower than the conveying portion and comprises a stretch, which extends partly towards the conveying portion and partly away form the conveying portion, while cross-bars extend between said chains, said cross-bars carrying teeth; a driven apportioning and return mechanism extending at a distance above the loosening conveyor; and a tilting device for taking up and discharging the material to the carrier conveyor, which tilting device has a support means, which in its lowermost position extends substantially at the level of the ground and is pivotable through approximately 90°, wherein the support member of the tilting device extends at least approximately perpendicular to the direction of motion of the carrier conveyor whereby a fibrous bundle carried by the loosening conveyor is tensioned on the teeth of the loosening conveyor when passing the end roller to which it is conveyed, and the tension is removed, and the bundle is released from the conveyor means, when the bundle reaches said stretch which extends partly toward and partly away from the conveying portion.

12. An apparatus as claimed in claim 11, wherein the support member consists of pins or the like, which extend at least approximately perpendicular to the direction of motion of the carrier conveyor.

13. An apparatus as claimed in claim 11, wherein the storage container is adapted to be exclusively supported by the tractor.

14. An apparatus as claimed in claim 11, wherein the material passing the loosening conveyor and the apportioning and return mechanism cooperating therewith is thrown directly on the ground.

15. An apparatus as claimed in claim 14, wherein the storage container is provided with a passage for the material at its relative end.

16. A conveyor means as claimed in claim 1 wherein the end rollers have a predetermined diameter, the cross-bars are spaced a pre-determined distance apart and the teeth have a pre-determined length so that on passing the end rollers the distance between the teeth on the cross-bars increases so that a fibrous bundle carried by teeth on adjacent cross bars is tensioned on the teeth and maintained on the conveying means, and, along the stretch, the distance between the teeth is decreased and the bundle is released.

* * * * *